United States Patent [19]
Dedrick

[11] Patent Number: 5,604,542
[45] Date of Patent: Feb. 18, 1997

[54] USING THE VERTICAL BLANKING INTERVAL FOR TRANSPORTING ELECTRONIC COUPONS

[75] Inventor: Rick Dedrick, Hillsboro, Oreg.

[73] Assignee: INTEL Corporation, Santa Clara, Calif.

[21] Appl. No.: 386,310

[22] Filed: Feb. 8, 1995

[51] Int. Cl.$^6$ .............................. H04N 7/00; H04N 7/08
[52] U.S. Cl. ................................ 348/552; 348/6; 348/10; 348/460; 348/478; 455/3.1
[58] Field of Search .................................... 348/473, 474, 348/478, 552, 465, 468, 460, 10, 6, 1, 9, 12, 13; 455/2, 3.1, 3.2, 4.1, 4.2, 5.1, 6.1, 6.2, 6.3; H04N 7/08, 7/00, 7/10

[56] References Cited

U.S. PATENT DOCUMENTS

| | | | |
|---|---|---|---|
| 5,014,125 | 5/1991 | Pocock et al. | 348/12 |
| 5,077,607 | 12/1991 | Johnson et al. | 348/6 |
| 5,287,181 | 2/1994 | Holman | 348/473 |
| 5,305,195 | 4/1994 | Murphy | 364/401 |
| 5,412,416 | 5/1995 | Nemirofsky | 348/10 |
| 5,442,771 | 8/1995 | Itlepp et al. | 395/650 |
| 5,446,919 | 8/1995 | Wilkins | 455/6.2 |
| 5,488,423 | 1/1996 | Walkingshaw et al. | 348/460 |

Primary Examiner—Michael Lee
Attorney, Agent, or Firm—Blakely, Sokoloff, Taylor & Zafman

[57] ABSTRACT

A system and method for transmitting an electronic advertisement within the vertical blanking interval of a video signal. The system includes an encoder that formats and inserts an electronic advertisement into the vertical blanking interval of the video signal, a transmitter that transmits the video signal and the electronic advertisement, a receiver that receives the video signal and the electronic advertisement, and a decoder which removes the electronic advertisement from the video signal. The electronic advertisement can be consumed by an end user by printing the ad, or by displaying the ad on a monitor. The printed advertisement can be returned to the advertiser by a carrier service. The advertiser may accredit an account of the end user upon receipt of the returned advertisement to provide an inducement to read the ad. The system may further have a demographic server located within a network of computers. The server may correlate demographic data of the end user with demographic data provided with the electronic advertisement so that the advertisement is routed to a targeted end user.

12 Claims, 3 Drawing Sheets

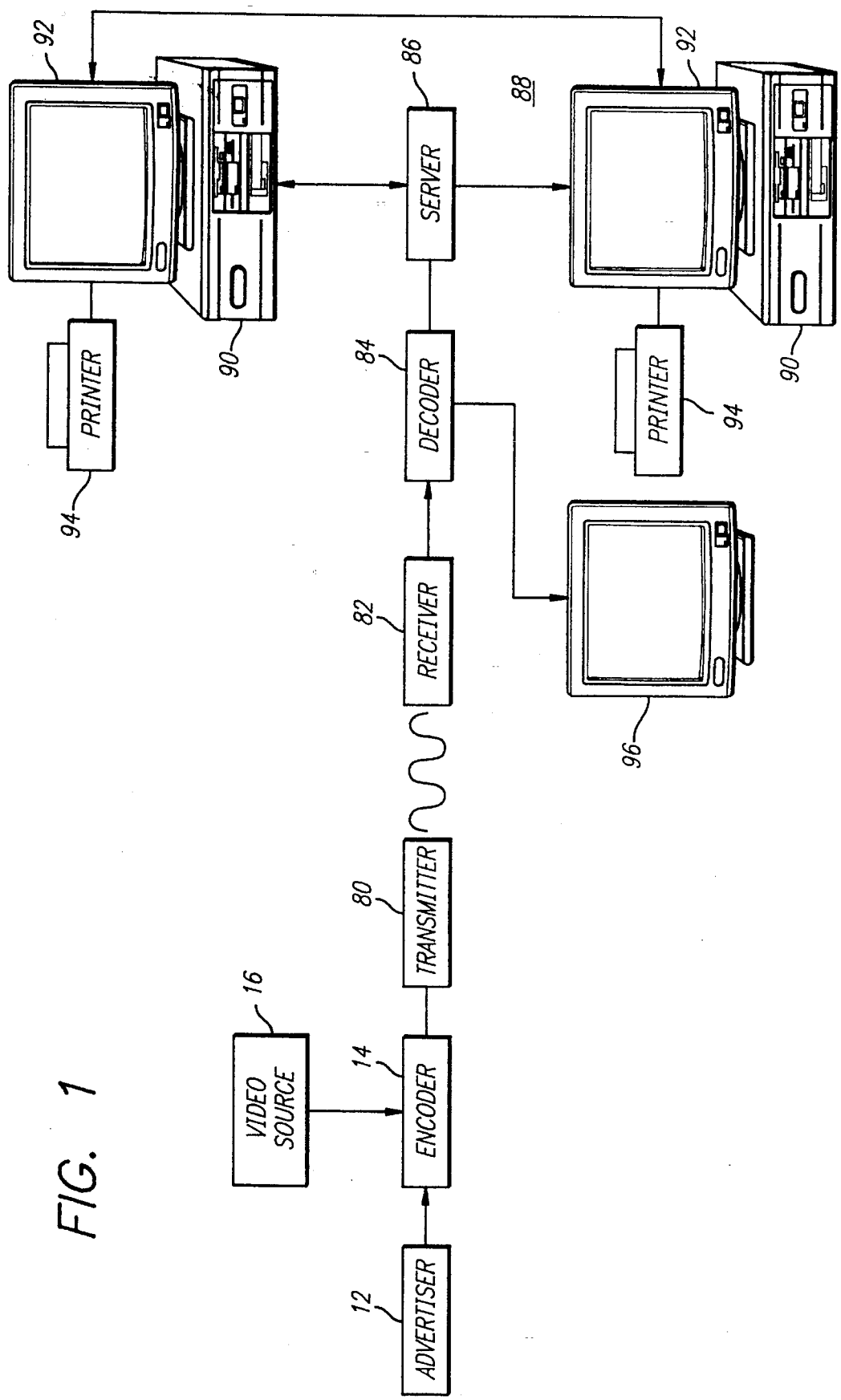

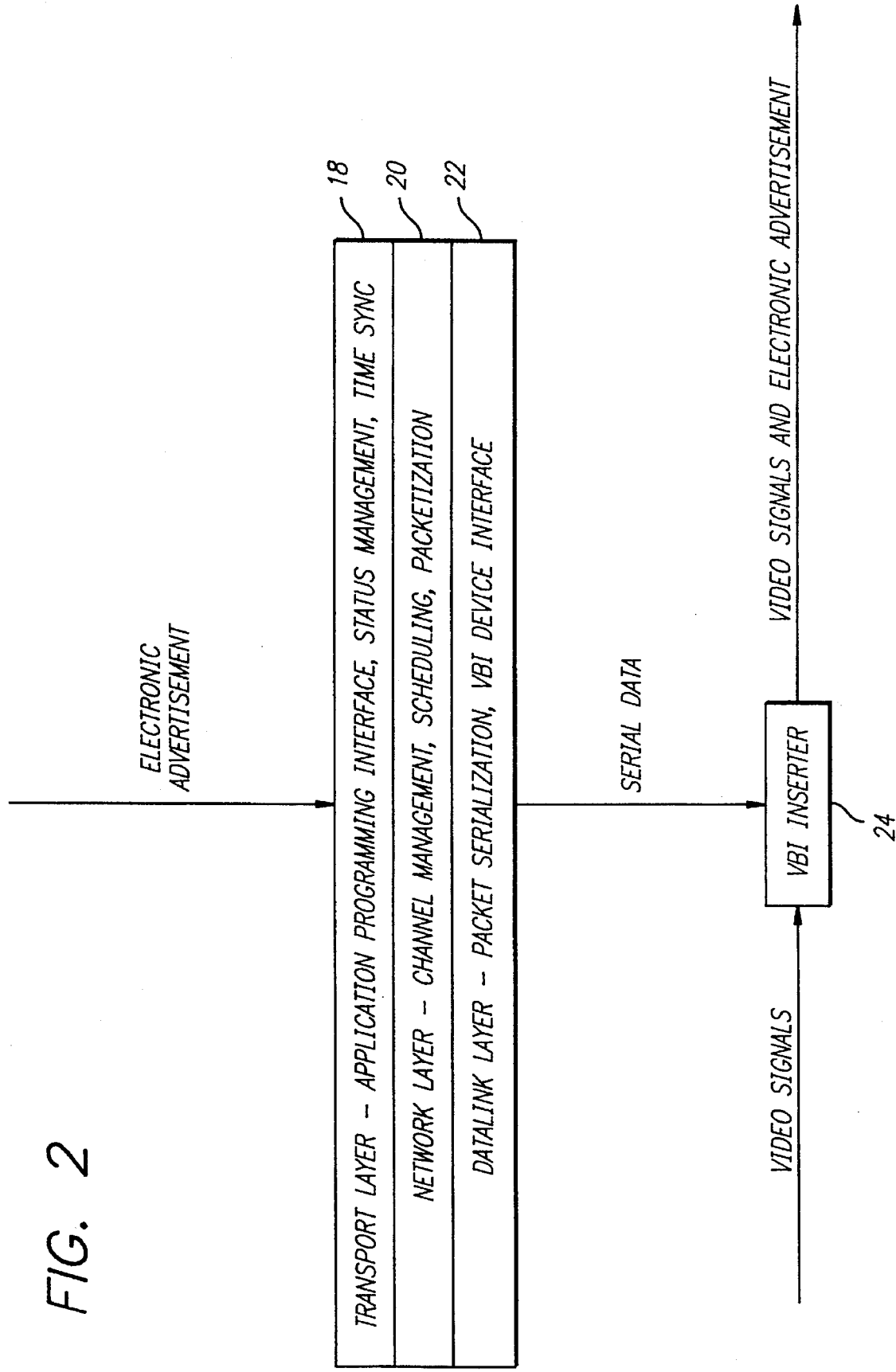

USING THE VERTICAL BLANKING INTERVAL FOR TRANSPORTING ELECTRONIC COUPONS

BACKGROUND OF THE INVENTION

1. Field of the Invention

The present invention relates to a system for transferring electronic advertisements within the vertical blanking interval of an analog video broadcasting system.

2. Description of Related Art

Computers are commonly linked together within a network. Such a network can be coupled to an analog video broadcasting system(s). The network may have a converter for converting the analog video format of a public broadcasting system into a digital format that can be received and displayed by computers linked to the network. Additionally, the computers may contain tuner cards which allow reception of video programming signals. The decoders and tuner cards allow end users to view video programing on a personal computer.

Computer user's provide a potentially large consumer market. It would be desirable for advertisers to transmit electronic advertisements to the end users of computer systems. To date there has not been developed a practical and cost effective system for distributing electronic advertisements to computer end users. It would be desirable to provide a system that transmits electronic advertising with the video programing of an analog video broadcasting system.

SUMMARY OF THE INVENTION

The present invention is a system and method for transmitting an electronic advertisement within the vertical blanking interval of a video signal. The system includes an encoder that formats and inserts an electronic advertisement into the vertical blanking interval of the video signal, a transmitter that transmits the video signal and the electronic advertisement, a receiver that receives the video signal and the electronic advertisement, and a decoder which removes the electronic advertisement from the video signal. The electronic advertisement can be consumed by an end user by printing the ad, or by displaying the ad on a monitor. The printed advertisement can be returned to the advertiser by a carrier service. The advertiser may accredit an account of the end user upon receipt of the returned advertisement to provide an inducement to read the ad. The system may further have a demographic server located within a network of computers. The server may correlate demographic data of the end user with demographic data provided with the electronic advertisement so that the advertisement is routed to a targeted end user.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a schematic of a system of the present invention;

FIG. 2 is a schematic showing the layers of a video encoder;

DETAILED DESCRIPTION OF THE INVENTION

Figure 5:
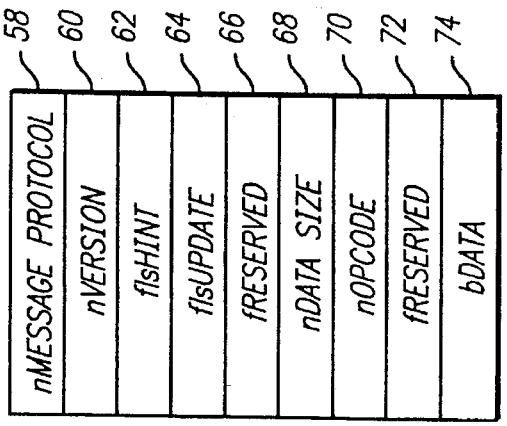
FIG. 5 is a schematic showing the formatting of a message provided to the encoder.

Referring to the drawings more particularly by reference numbers, FIG. 1 shows a system 10 of the present invention. The system 10 inserts electronic advertisements into the vertical blanking interval of a video signal and transmits the video signal and the advertisement to an end user.

The system 10 includes an advertiser 12 which generates an electronic advertisement. The advertiser 12 can be a computer which contains a process for creating electronic advertisements. The process may allow the advertiser to create text, graphics, sound, video, and/or any combination thereof. The electronic advertisement is provided to an encoder 14 which inserts the ad into the vertical blanking interval of a video signal. The advertisement can be provided to the encoder 14 by a communication link such as a network line, or any other means.

The encoder 14 receives a video signal from a video source 16. The video source 16 may be a publicly broadcasted television station which provides video signals that are transmitted to the general public. The encoder 14 typically contains a formatter which formats the electronic advertisement, and a vertical blanking interval (VBI) inserter which inserts the formatted advertisement into the vertical blanking interval of the video signal. The VBI inserter can be a unit sold by Norpak Corp. of Ottawa, Ontario, Canada under model number TDS-3.

Figure 3:
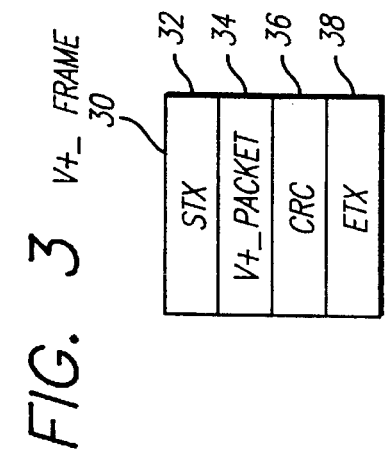
FIG. 3 is a schematic showing the formatting of a video frame that is inserted into the video blanking interval of a video signal.

As shown in FIG. 2, the formatter of the encoder 16 may have different application layers, including a transport layer 18, a network layer 20 and a datalink layer 22 which convert the electronic advertisement into a serial data stream that can be inserted into the vertical blanking interval by a VBI inserter 24. The transport layer 18 provides an interface with the advertiser 12. The network layer 20 packetizes the advertisement. The datalink layer 22 serializes the packeted advertisement for serial transmission to the VBI inserter 24. In the preferred embodiment, the advertisement is provided to the VBI inserter in a Vt_Frame 30 shown in FIG. 3. The Vt_Frame 30 includes a start frame field STX 32, a data packet field Vt_Packet 34, a check field CRC 36 and an end of frame character ETX 38.

Figure 4:
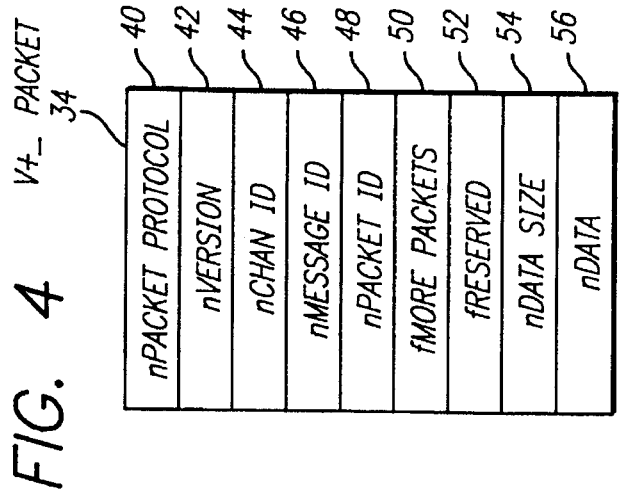
FIG. 4 is a schematic showing the formatting of a video packet.

In the preferred embodiment, the Vt_Packet 34 is formatted as shown in FIG. 4. The nPacketProtocal field 40 is a byte-length field which identifies the packet as one supported by the protocol. The nVersion field 42 specifies the type of encoder that is transmitting the packet. The nChanID field 44 is an integer value which provides the channel number of the packet in the serialized bitstream. The nMessageID field 46 specifies the message number of the channel on which the packet is transmitted. The nPacketID field 48 defines the number of packets in a particular message. The fMorePackets field 50 specifies whether there are any more packets in the message. The fReserved field 52 is reserved for further use. The length of the data is specified in the nDataSize field 54. The bData field 56 contains the advertising data.

In the preferred embodiment, the electronic advertisement is typically provided to the encoder 14 by the advertiser 12 in the format shown in FIG. 5. The nMessageProtocal field 58 is a byte length field which identifies the type of transmission being provided. For example, the advertisement may be a redeemable coupon, or a nonredeemable coupon, etc. The nVersion field 60 identifies the version of the protocol. The flsHint field 62 indicates that the advertisement is to precede an event such as a television program. The flsUPdate field 64 indicates whether the information is updating transmitted information. The fReserved field 66 is unused and reserved for later use. The field nDataSize 68 specifies the number of bytes in the data field. The nOpcode field 70 define a particular operation to be performed with the data. For example, the operation may be a comparison of user profile data provided in the data field with user profile data stored in the receiver portion of the system. The fReserved2 field 72 is not used and the bData field 74 contains the advertisement data.

Referring to FIG. 1, the encoder 14 provides the video signal and the electronic advertisement to a transmitter 80 which transmits the information to a receiver 82. The transmitter 80 and receiver 82 may utilize any conventional broadcasting systems typically associated with the transmission of video signals, including but not limited to cable and satellite broadcasting networks.

The receiver 82 provides the transmitted information to a decoder 84. The decoder 84 essentially performs the reverse function of the encoder 14, by removing the electronic advertisement from the vertical blanking interval and unpacketizing the transmitted information. The decoder 84 may provide the information to a server 86 which serves a network 88. The network may be a local area network (LAN), wide area network (WAN) or a metropolitan area network (MAN) that links together a plurality of computers 90. The server 86 can transmit the information to the computers 90 within the network. For computers 90 with a video capability, the end users may display both the video and the advertisement on a video monitor of the computer 92.

The decoder 84, server 86 and/or computer 90 may also remove the advertisement from the video signal so that the end user can consume the ad separately from the video. The end user can also print out the advertisement on a printer 94. To induce viewing of the ad, the printed advertisement may be in the form of a coupon which can be returned to the advertiser through a mail courier service, such as the U.S. Postal Service. The advertiser may provide a credit to the end user upon receipt of the coupon. The credit may be in the form of a direct cash conversion of the coupon, or a reduction in the price of a purchased item, etc. The decoder 84 may separate the advertisement from the video and transmit the video to a television receiver 96 and separately provide the advertisement to the computers 90. Although the decoder 84 is shown separate from the computer 90, it is to be understood that the computer may also contain the hardware and/or software required to perform the functions of the decoder 84.

Figure 6:
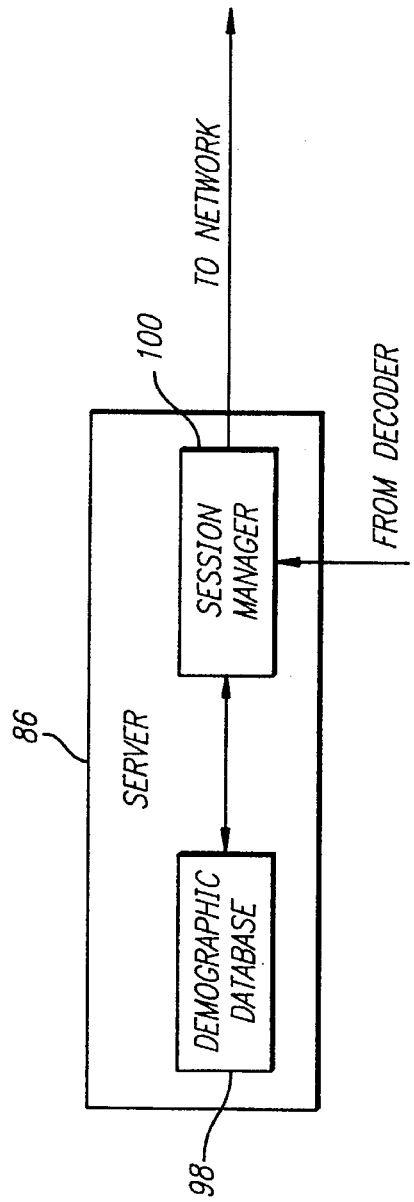
FIG. 6 is a schematic of a server.

As shown in FIG. 6, the server 86 may contain a demographic database 98 that contains user profile data of the end users. The user profile data can be used to associate an advertisement with a particular end user by a session manager 100. For example, the electronic advertisement may contain information to transmit the ad to all end users under the age of 25. The session manager 98 can then access the demographic database to obtain a list of the end users within the network that are under the age of 25 and then send the ad to the targeted end users. Additionally, the server 86 may provide additional information with the advertisements sent to each end user. For example, the server 86 may insert into the advertising data information regarding the race, sex, income, etc. of the end user targeted to receive the advertisement. The additional demographic information may be printed out onto the ad coupon, so that if the end user returns the coupon to the advertiser, the advertiser can compile demographic information on the end users.

In operation, the advertiser creates an electronic advertisement which is transferred to the encoder 14. The encoder 14 formats and packetizes the data, and places the packeted data into a frame that is serially inserted into the vertical blanking interval of a video signal. The video signal and electronic advertisement are transmitted to a receiver 82 which downloads the information to a decoder 84. The decoder 84 decodes the information and removes the electronic advertisement from the video signal. The video signal can be provided to a television receiver 96. The electronic advertisement and the video signal can be provided to the computers 90 for consumption by the end user. The server 86 may insert demographic information into the electronic advertising data transferred to the computers. The end user may print out the ad as a coupon and return the ad to the advertiser. The advertiser can then accredit the end user with consumption of the ad.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system for distributing an electronic advertisement, comprising:

an encoder that inserts the electronic advertisement into a vertical blanking interval of a video programming signal;

a transmitting device that transmits the video programming signal and the electronic advertisement;

a receiving device that receives the video programming signal and the electronic advertisement;

a decoder that removes the electronic advertisement from the vertical blanking interval of the video programming signal; and, a metering server which correlates a user profile transmitted with the electronic advertisement with a user profile located within a demographic database that is stored within said metering server, and transfers the electronic advertisement to an end user computer which has a user profile that corresponds to the transmitted user profile.

2. The system as recited in claim 1, further comprising a computer which displays the electronic advertisements.

3. The system as recited in claim 1, further comprising a computer and a printer that prints out the electronic advertisements into a coupon which can be redeemed by an end user.

4. The system as recited in claim 1, further comprising an advertising source which generates the electronic advertisement.

5. A system for distributing an electronic advertisement, comprising:

encoder means for inserting the electronic advertisement into a vertical blanking interval of a video programming signal;

transmitting means for transmitting the video programming signal and the electronic advertisement;

receiving means for receiving the video programming signal and the electronic advertisement;

decoder means for removing the electronic advertisement from the vertical blanking interval of the video programming signals; and, metering means for correlating a user profile transmitted with the electronic advertisement with a user profile located within an end user database that is stored within said metering means and transferring the electronic advertisement to an end user computer which has a user profile that corresponds to the transmitted user profile.

6. The system as recited in claim 5, further comprising a computer which displays the decoded electronic advertisement.

7. The system as recited in claim 5, further comprising a computer and a printer that prints out the electronic advertisement into a coupon which can be redeemed by an end user.

8. The system as recited in claim 5, further comprising an advertising source which generates the electronic advertisement.

9. A method for transmitting electronic advertisements, comprising the steps of:

a) generating an electronic advertisement;

b) inserting the electronic advertisement into a vertical blanking interval of a video programming signal;

c) transmitting the video programming signal and the electronic advertisement to a metering server;

d) receiving the video programming signal and the electronic advertisements;

e) removing the electronic advertisement from the video programming signal; and, comparing a user profile that is transmitted with the electronic advertisement with a user profile within a demographic database that is stored within said metering server; and, transmitting the electronic advertisement to an end user computer if the transmitted user profile corresponds to the database user profile.

10. The method as recited in claim 9, further comprising the steps of printing the electronic advertisement as a coupon, and mailing the coupon to an advertising source.

11. The method as recited in claim 10, wherein an end user is provided with a credit for making the coupon.

12. The method as recited in claim 10, further comprising the step of providing user profile information that is printed onto the coupon.

* * * * *

UNITED STATES PATENT AND TRADEMARK OFFICE
CERTIFICATE OF CORRECTION

PATENT NO. : 5,604,542
DATED : February 18, 1997
INVENTOR(S) : Rick Dedrick

It is certified that error appears in the above-indentified patent and that said Letters Patent is hereby corrected as shown below:

In column 1 at line 21 delete "programing" and insert --programming--

In column 1 at line 30 delete "programing" and insert --programming--

Signed and Sealed this

Twenty-fourth Day of June, 1997

Attest:

BRUCE LEHMAN

Attesting Officer

Commissioner of Patents and Trademarks